United States Patent [19]

Dietschy et al.

[11] E Re. 29,861

[45] Reissued Dec. 19, 1978

[54] STITCH PRESSER FOR KNITTING MACHINE

[75] Inventors: Robert Dietschy; Georges Hexel, both of Couvet, Switzerland

[73] Assignee: Edouard Dubied et Cie, Neuchatel, Switzerland

[21] Appl. No.: 832,495

[22] Filed: Sep. 12, 1977

Related U.S. Patent Documents

Reissue of:

[64] Patent No.: 4,027,504
Issued: Jun. 7, 1977
Appl. No.: 704,171
Filed: Jul. 12, 1976

[30] Foreign Application Priority Data

Nov. 25, 1975 [CH] Switzerland ..... 15251/75

[51] Int. Cl.[2] ..... D04B 7/04
[52] U.S. Cl. ..... 66/64
[58] Field of Search ..... 66/60, 64, 147, 149 S

[56] References Cited

U.S. PATENT DOCUMENTS

| | | | |
|---|---|---|---|
| 2,405,162 | 8/1946 | Nyhois | 66/147 |
| 3,049,900 | 8/1962 | Bram | 66/60 |
| 3,153,922 | 10/1964 | Bram | 66/64 |
| 3,685,317 | 8/1972 | Giachetti | 66/64 |
| 3,839,884 | 10/1976 | Flavell | 66/64 |
| 3,842,623 | 10/1974 | Flavell | 66/64 |
| 3,952,553 | 4/1976 | Kohler | 66/64 |
| 3,973,416 | 8/1976 | Kohler | 66/64 |

FOREIGN PATENT DOCUMENTS

| | | | |
|---|---|---|---|
| 1133662 | 4/1957 | France | 66/64 |

*Primary Examiner*—Ronald Feldbaum
*Attorney, Agent, or Firm*—Henry L. Brinks; Peter E. Heuser

[57] ABSTRACT

A stitch presser for a knitting machine equipped with at least two needle beds arranged in an inverted "V", and provided with needles which intersect during their upward movement, a carriage movable above the needle beds, a system for control of the needles during their displacement in alternate directions, and a means for the alternate control of the stitch presser along a row of needles and in another adequate position for the movement in the opposite direction wherein the stitch presser acts between two needle beds on the stitches held by the needles. The stitch presser includes a slide thread for pressing the knitwear and a supplementary means for pressing the stitches against the needle beds.

10 Claims, 11 Drawing Figures

Fig. 1
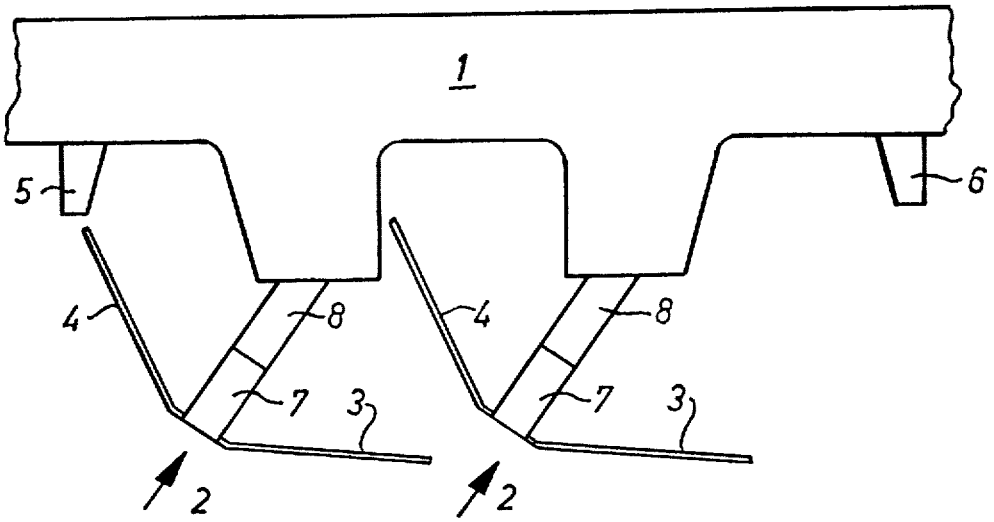
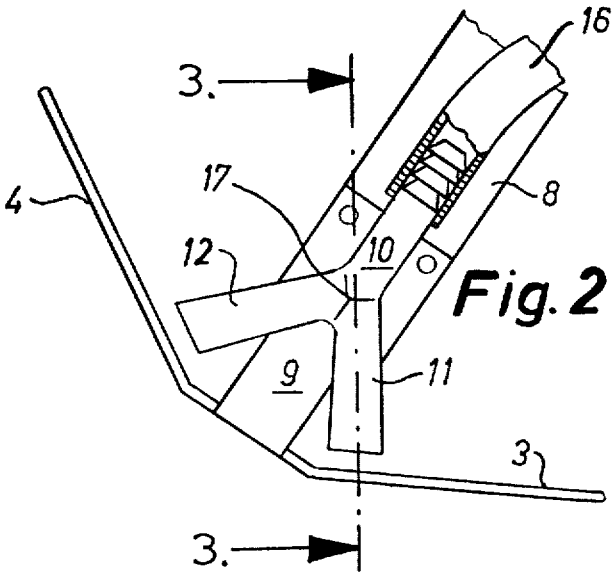
Fig. 2
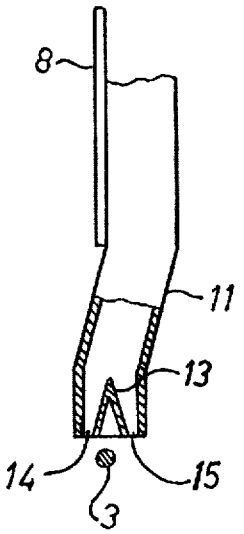
Fig. 3

Fig. 4
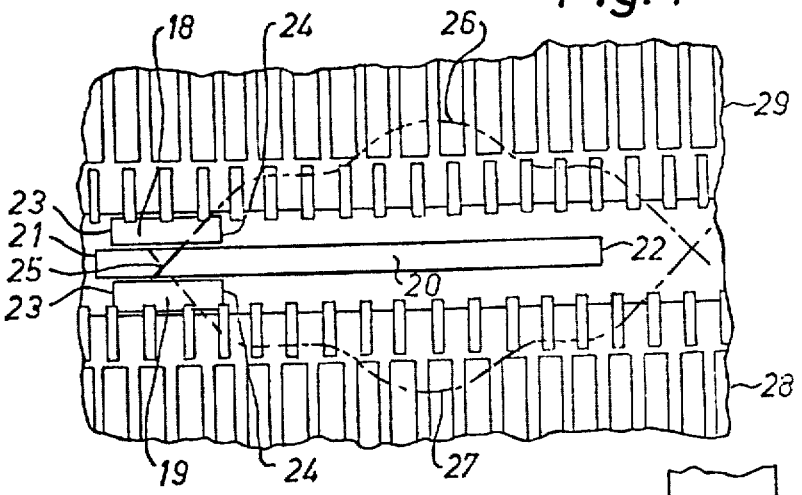
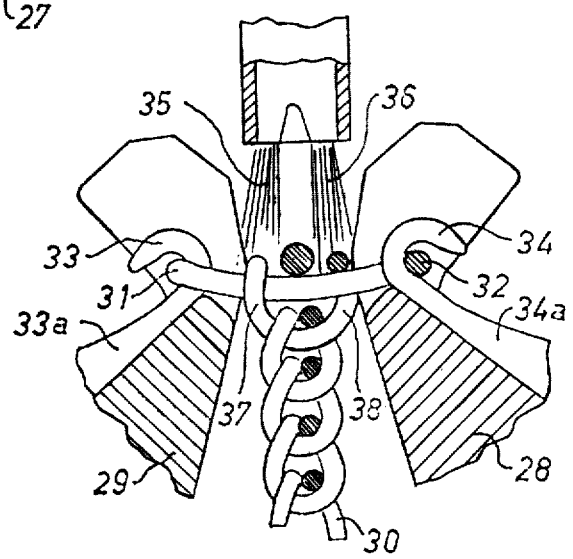
Fig. 5
Fig. 6
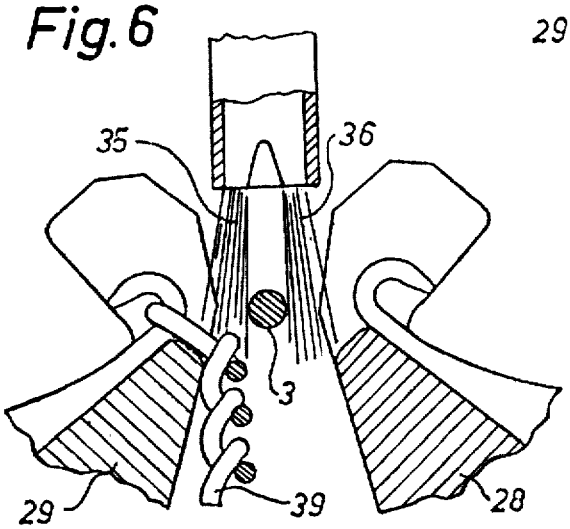

Fig. 10
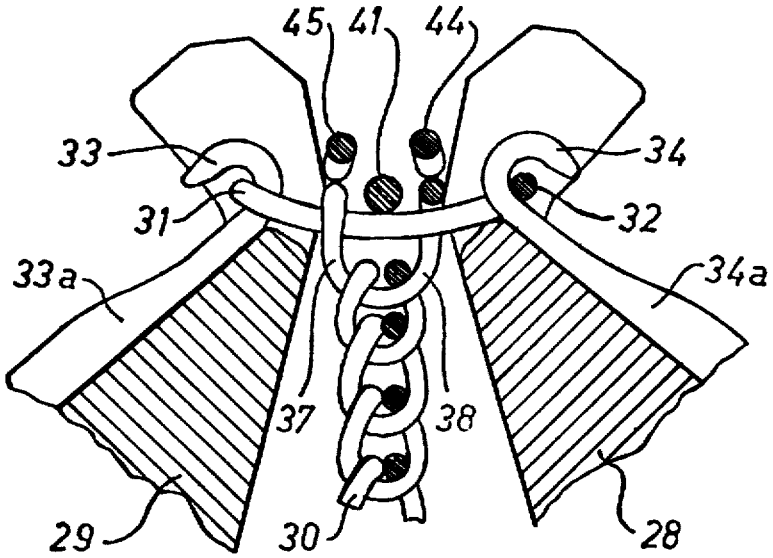
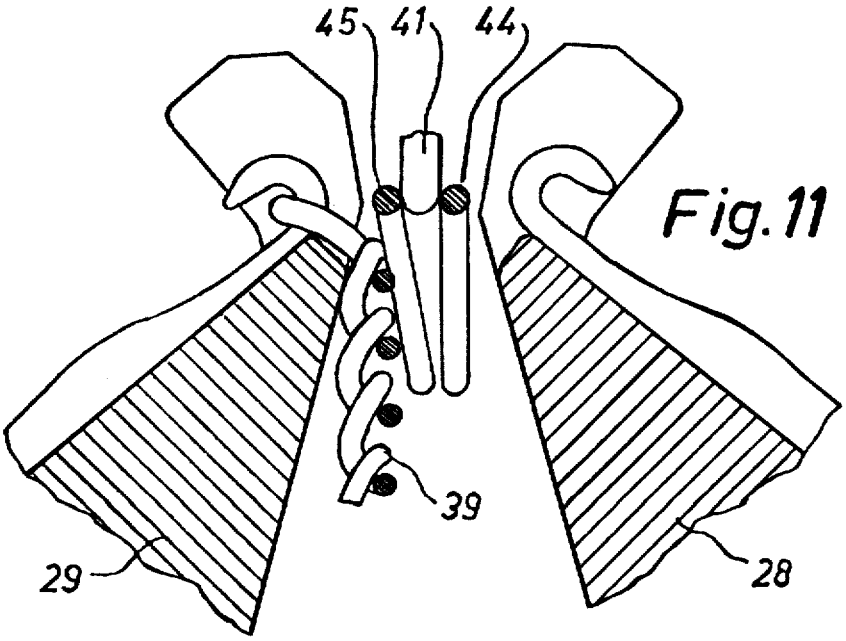
Fig. 11

STITCH PRESSER FOR KNITTING MACHINE

Matter enclosed in heavy brackets [ ] appears in the original patent but forms no part of this reissue specification; matter printed in italics indicates the additions made by reissue.

BACKGROUND OF THE INVENTION

The present invention relates to a stitch presser for knitting machines. More particularly, the present invention provides a stitch presser with a slide presser for pressing the knitwear and a supplementary means for pressing the stitches against the needle beds.

In a flat knitting machine where the needles are controlled in both oscillating movements of the carriage by lock fixed below said carriage it is known to mount a device for the control of the stitch presser directly on the carriage, so that one of the slide threads constituting the pressing member of the stitch presser operates when the carriage is moved in an opposite direction. It is also customary to assign one stitch presser device to each knitting system or to each pair of knitting systems, if the knitting is done on two needle beds. Furthermore, it is known to assign one stitch presser to each knitting system or to each pair of knitting systems when the knitting is done on two needle beds and to modify the position of the stitch presser at the end of each stroke of the carriage, so that it is possible to successively work in two opposite directions.

Stitch pressers traditionally include slide threads of different shapes and are sometimes completed by other means such as rollers, blade scrapers or brushes, all being afflicted with the disadvantage of being useable for only part of the knitting fabrics and particularly not for mixed fabrics, for example, one form of slide thread can be used only for a limited lock or mesh density and a selected fabric. The stitch pressers equipped with rollers, blade scrapers, brushes, etc., present the inconvenience of discontinuity of action on the knitwear i.e., the space between the roller scraper, or brush, and the beginning of a slide thread is not controlled.

SUMMARY

The stitch presser of the invention includes a slide thread and a supplementary means whose field of action is at least partially superposed over the field of action of the slide thread and whose field of action starts ahead of the first point of crossing of the needles, seen in the moving direction of the carriage. Normally the field of action of the supplementary means will also end ahead of the end of the complete upward movement of the needles. The cumulative width of the field of action will ordinarily be at least equal to the spacing measured between two needle beds. The slide thread presses the knitwear and the supplementary means acts to press the stitches against the needle beds to improve on the conventional action of the slide thread which often results in irregular columns of stitches on the knitwear due to excessive friction between the slide thread and the stitch.

Preferrably, the supplementary means is a fluid, for example, compressed air or water, or an auxiliary slide including additional slide threads.

It is advantageous to mount a valve at the fluid distribution point, in order to direct it toward one or another principal slide thread depending on whether the carriage is moved in one direction or in the opposite direction. It is also advantageous for the fluid to be directed in a direction which is not perpendicular to the movement of the carriage.

Accordingly, the primary object of the invention is to provide a simple device which is easily adaptable to a stitch presser, which controls the friction between the slide thread and the knitwear. Another object is a return means for a stitch presser, acting in the space between the two needle beds, independently of the thickness of the yarn or the kind of knitwear.

The novel features which are believed to be characteristic of the invention are set forth in the appended claims. The invention itself, however, together with further objects and attendant advantages thereof, will be best understood by reference to the following description taken in connection with the accompanying drawings, in which:

FIG. 1 is a partial view of a stitch presser for a knitting machine according to the invention:

FIG. 2 is a front view of a stitch presser according to the invention;

FIG. 3 is a partial section along 3—3 of FIG. 2;

FIG. 4 is a schematic representation of the fields of action of one slide thread and of the compressed air jets in relation to the needle beds and the trajectories of the needles;

FIG. 5 is a section of the needle beds at a larger scale, just ahead of the point of intersection of the needles;

FIG. 6 is similar to FIG. 5 for a different knitwear material;

FIG. 10 shows a section of the needle beds on a larger scale and of the slide threads along 10 of FIG. 7; and FIG. 11 is a section similar to FIG. 10, along 11 of FIG. 7 for another knitwear fabric.

DESCRIPTION OF THE PREFERRED EMBODIMENT

Figure 7:
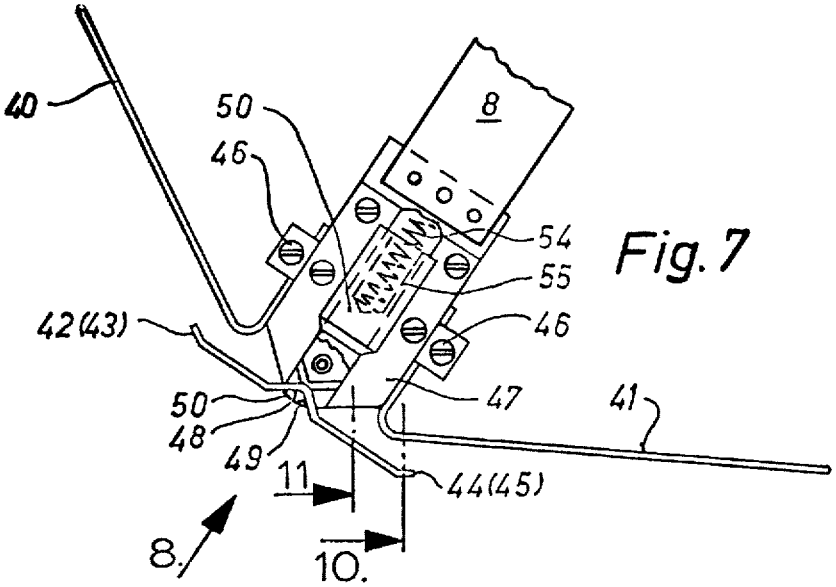
FIG. 7 is a front view of a variation according to the invention.

The stitch presser 1 represented in FIG. 1 comprises two stitch pressing means 2. Each stitch pressing means 2 consists of a slide thread 3 which operates when the knitting carriage is moved from right to left on the knitting machine, and of a slide thread 4 which works when the carriage is moved in the opposite direction.

The stops 5 and 6 are used to reverse the stitch pressers after the carriage has arrived at its end of stroke.

The fixation means of the stitch pressing device on the carriage and the reversing means of the stitch pressers are known from prior art and outside the scope of this invention. They are neither described nor shown.

The slide threads 3 and 4 form one piece with a support 7 which in turn is mounted by means known and not shown, on the lever 8.

A pipe for supplying compressed air forms one piece with the support 9. It includes two pipes 11 and 12 respectively to conduct compressed air toward the slide threads 3 and 5 respectively.

The pipes 11 and 12, shown in FIG. 3, include a baffle 13, thereby separating the end of the pipes into two nozzles 14 and 15. The supply of compressed air is accomplished via the flexible pipe 16 connected on the one hand to the pipe 10 and on the other hand to a device which may or may not form one piece with a knitting machine, and capable of supplying said compressed air. This kind of device is known, it is outside the scope of the invention and thus not shown. Provisions are made to mount, at the point of distribution 17, a valve making it possible to direct compressed air toward pipe 11 or pipe 12, depending on whether the carriage is moved from the right to the left or from the left to the right, on the knitting machine.

The fields of action 18 and 19 of the nozzles 14 and 15 respectively are shown schematically in FIG. 4. The slide thread 3 will have a field of action 20 shown between the two fields of action of the nozzles.

Reference symbols 21 and 22 show the start and end, respectively of the field of action of the slide thread 3.

Reference symbols 23 and 24 show the start and end, respectively of the fields of action 18, 19 of the nozzles 14, 15.

The start of the field of action (23) of a nozzle is located ahead of the first crossing point 25 of the needles viewed in the direction of movement of the carriage, and ends ahead of the end of the complete upward movement of the needles in stitch formation. The curves 26 and 27 respectively, drawn in dots and dashes represent the trajectories of the needle hooks working on a front needle bed 28, and/or of a rear needle bed 29 of a knitting machine.

The fields of action 18, 19 of the nozzles are superposed over the field of action of the slide thread 3, so that they commence after the start 21 and terminate prior to the end 22 of the field of action 22 of the slide thread 3.

The cumulative width of the fields of action is at least equal to the distance between the two needle beds 28, 29.

During the knitting on two needle beds 28, 29, the knitwear 30 is held by the stitches 31 in the needle hook 33 and by the stitches 32 in the needle hook 34.

The arrangement shown is the one we find just prior to the needles being moved by the locks of the knitting carriage.

The slide thread 3 presses on the knitwear 30 and the compressed air spouts 35 and 36 originating from the nozzles 14 and 15 respectively press the stitches 37 and 38 against the needle beds 29 and 28 respectively. During the start of the upward movement of the needles, the stitches 31, 32 expand and the slide thread 3 along with the compressed air jets 35, 36, press the knitwear 30 downward, so as to make sure that the stitches 31, 32 remain taut. During the upward movement the compressed air spouts 35, 36 aid the stitch 31, 32, to slide along the needle body 33a, 34a.

The combination of the two elements, compressed air and slide thread, make possible the judicious dimensioning of the slide thread, to avoid excessive friction of the slide thread on the stitch, which could cause irregular columns of stitches to appear on the knitwear, that is columns which would not be strictly straight, with the knitting on one needle bed 29 only, the same device may be used. FIG. 6 is a view similar to FIG. 5, but for knitting on one needle bed only. In that case, the action of the slide thread 3 on the knitwear 39 is considerably reduced, it has a tendency to slide on the knitwear to be placed in the free space remaining between said knitwear 39 and the opposite needle bed 28. On the other hand, the compressed air spout 35 remains completely active and suffices to compensate for the lack of work furnished by the slide thread 3.

Thus it is readily understood that such an apparatus allows for the knitting on one and two needle beds in one and the same row of stitches or in different rows of stitches.

It may be advantageous to direct the fluid in a direction which is not perpendicular in relation to the movement of the carriage, so as to contribute toward a possible balancing of the stitches.

Figure 8:
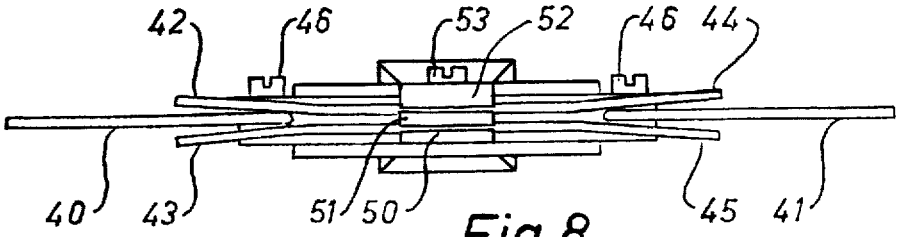
FIG. 8 is a view along 8 of FIG. 7.

The stitch presser shown in FIGS. 7 and 8 is a variation of the additional device mentioned in the object of our invention.

It consists of the principal slide threads 40, 41 and auxiliary flexible slide threads 42, 43, 44, 45. The principal slide threads 40, 41 form one piece, by way of fixation means 46, with a support 47 which is mounted to the lever 8 by means known and not shown.

The auxiliary flexible slide threads 43, 45 are placed in grooves 48, 49 located in slot 50. By their shapes they are positioned directly. The auxiliary flexible slide threads 42, 44 are placed in an identical manner in a crosspiece 51, all of this being fixed with the aid of a cover 52 and fixation means 53. A compression spring 54 is located on the one hand in the housing 55 of the slot 50 and on the other hand against the support 47.

The auxiliary flexible slide threads 42, 43 and 44, 45, are provided so that they can be concealed on each side of the principal slide thread 40, 41 respectively.

Figure 9:
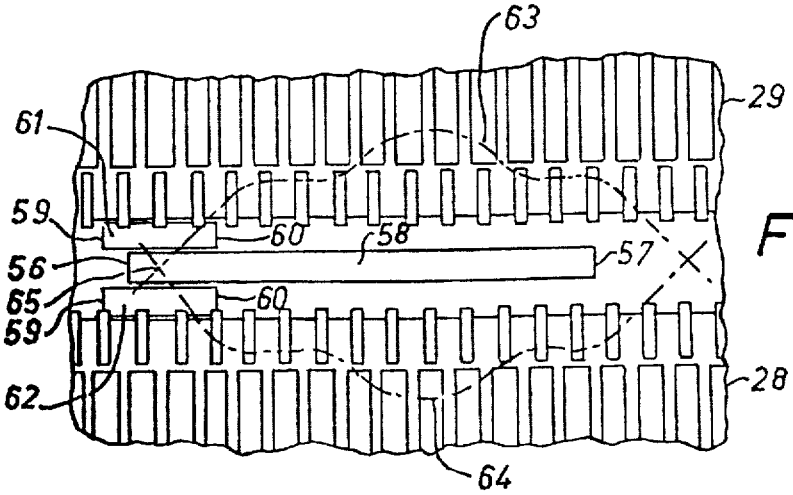
FIG. 9 is a representation similar to FIG. 4.

The fields of action of the above mentioned slide threads, in spacing of the needle beds are shown in FIG. 9.

The reference symbols 56 and 57 show the start and the end respectively of the field of action 58 of a principal slide thread 41.

The reference symbols 59 and 60 represent the start and end respectively of the fields of action 61 and 62 of the auxiliary flexible slide threads 45 and 44. The end 60 of the fields of action 61, 62 of said flexible auxiliary slide threads is located, seen in the direction of movement of the carriage, after the start 56 and prior to the end 57 of the field of action 58 of a principal slide thread 41. The fields of action 61, 62, 58 thus are partly superposed.

The curve 63 and 64, represent the trajectory of the needle hooks working on a front (28) and a rear (29) needlebed of a knitting machine.

The cumulative width of the fields of action 61, 58, 62, is at least equal to the distance separating both needle beds 28, 29.

The fields of action 61, 62 of the auxiliary flexible thread slides commence, seen in the operating direction of the knitting carriage, prior to the first crossing point 65 of the needles, and terminate prior to the complete upward movement of the needles.

During the knitting on two needle beds 28, 29 (FIG. 10), the stitches 31 and 32 are maintained in the hook 33 and 34, of the needles. The needles have not yet moved upward. The principal slide thread 41 presses on the knitwear 30. The auxiliary flexible slide threads 45 and 44 press against the needle beds 29 and 28 and on the already formed stitches 37 and 38. To arrive in this position, the auxiliary flexible slide threads 45, 44 have been compressing the compression spring 54 by the movement they have caused to the slot 50. The end of the auxiliary flexible slide threads 44, 45 is found just below the roof (or inverted V-shaped part) formed by the crossing of the needles. To facilitate the comprehension of the drawing, the following needles which have already started their upward movement or which have partly moved upward, are not shown.

During the knitting on one needle bed 29 only, according to FIG. 11, the auxiliary flexible slide thread 45 presses the knitwear 39 downward and against the needle bed 29, the auxiliary flexible slide thread 44, like the principal slide thread 41, are used as self-centering elements of the slide threads in the spacing of the needle beds. The slot 50 (FIG. 7) is in low position, under this action of the compression spring 54.

It thus is readily understood that with such a device it is possible to knit fabrics on one or two needle beds and even mixed fabrics in one and the same knitting row.

A mixed contexture of fabric will cause a back and forth movement of the slot 50, enabling it to assume the position according to FIG. 10 or according to FIG. 11, depending on whether the auxiliary flexible slide threads 44, 45 are located in one knitting range on two needle beds (FIG. 10) or on one needle bed (FIG. 11).

The knitter thus has in his hands a simple apparatus, enabling him to considerably increase the field of application of the stitch pressers. He has a self-adjustable system as to width which no longer is a function of the contexture of the knitwear. He has thus a device working in the entire area separating the needle beds and particularly very near the needle beds.

Of course, it should be understood that various changes and modifications in the preferred embodiments described herein will be apparent to those skilled in the art, such changes and modifications can be made without departing from the spirit and scope of the present invention and without diminishing its attendant advantages. It is, therefore, intended that such changes and modifications be covered by the following claims.

What is claimed is:

1. An improved stitch presser for a knitting machine equipped with the following:

at least two needle beds arranged in an inverted V-shape;

needles capable of intersecting during their upward movement;

a carriage movable above the needle beds;

a system for control of the needles during their displacement in alternate directions;

a stitch presser which acts between the two needle beds on the stitches held by the needles; and means for alternate control of the stitch presser in a position adequate for the movement of said stitch presser along a row of needles and in another position adequate for the movement in the opposite direction;

wherein the stitch presser comprises a slide thread for pressing the knitwear and a supplementary means for pressing the stitches against the needle beds, the field of action of the supplementary means being at least partially superimposed over the field of action of the slide thread and whose field of action starts ahead of the first point of crossing of the needles, seen in the moving direction of the carriage.

2. The stitch presser of claim 1 wherein the field of action of the supplementary means ends ahead of the end of the complete upward movement of the needles, and wherein the cumulative width of the field of action of said slide thread and said supplementary means is at least equal to the spacing measured between the needle bed.

3. The stitch presser of claim 1 wherein the supplementary means is a nozzle through which a fluid is ejected to press the stitches against the needle beds.

4. The stitch presser of claim 3 wherein the nozzle ejects the fluid in a direction which is not perpendicular to the movement of the carriage.

5. The stitch presser of claim 4 wherein the fluid is compressed air.

6. The stitch presser of claim 5 wherein the fluid is a liquid.

7. The stitch presser of claim 2 wherein the supplementary means comprises a flexible thread slide mounted on a slot working against the effect of a compressible member.

8. The stitch presser of claim 7 wherein the compressible member is a spring.

9. An improved stitch presser for a knitting machine equipped with at least two needle beds arranged in an inverted V-shape, with needles capable of intersecting during their upward movement, with a carriage movable above the needle beds, with a system for control of the needles during their displacement in alternate directions, and with a stitch presser which acts between the two needle beds on the stitches held by the needles and which includes means for alternate control of the stitch presser in a position adequate for the movement of said stitch presser along a row of needles and another position for the movement in the opposite direction;

wherein the stitch presser comprises a slide thread and supplementary means whose field of action is at least partially superposed over the field of action of the slide thread and whose field of action starts ahead of the first point of crossing of the needles, seen in the moving direction of the carriage.

10. The stitch presser of claim 9 wherein the field of action of the supplementary means ends ahead of the end of the complete upward movement of the needles, and wherein the cumulative width of the field of action of said slide thread and said supplementary means is at least equal to the spacing measured between the needle bed.

* * * * *